(12) United States Patent
Davis et al.

(10) Patent No.: US 6,172,164 B1
(45) Date of Patent: Jan. 9, 2001

(54) PROCESS FOR MAKING GRAFT POLYOLS USING T-AMYL PEROXY FREE RADICAL INITIATOR

(75) Inventors: John E. Davis, Woodhaven; Duane A. Heyman, Monroe; Joseph R. Gregoria, Southgate, all of MI (US)

(73) Assignee: BASF Corporation, Mt. Olive, NJ (US)

( * ) Notice: Under 35 U.S.C. 154(b), the term of this patent shall be extended for 0 days.

(21) Appl. No.: 09/283,492

(22) Filed: Apr. 1, 1999

(51) Int. Cl.$^7$ ............. C08F 291/08; C08F 293/00; C08F 4/38
(52) U.S. Cl. ............. 525/263; 525/273; 525/298; 525/302; 525/309; 525/332.9; 525/333.3; 525/56; 525/118; 526/232.5
(58) Field of Search ............. 525/263, 273, 525/298, 302, 309, 332.9, 333.3, 56, 118; 526/232.5

(56) References Cited

U.S. PATENT DOCUMENTS

| | | |
|---|---|---|
| Re. 28,715 | 2/1976 | Stabmberger . |
| Re. 29,014 | 10/1976 | Pizzini et al. . |
| Re. 33,291 | 8/1990 | Ramlow et al. . |
| 3,652,639 | 3/1972 | Pizzini et al. . |
| 3,875,258 | 4/1975 | Patton, Jr. et al. . |
| 3,931,092 | 1/1976 | Ramlow et al. . |
| 3,931,450 | 1/1976 | Patton, Jr. et al. . |
| 3,950,317 | 4/1976 | Patton, Jr. et al. . |
| 3,953,393 | 4/1976 | Ramlow et al. . |
| 3,966,521 | 6/1976 | Patton, Jr. et al. . |
| 4,014,846 | 3/1977 | Ramlow et al. . |
| 4,093,573 | 6/1978 | Ramlow et al. . |
| 4,148,840 | 4/1979 | Shah . |
| 4,172,825 | 10/1979 | Shook et al. . |
| 4,242,249 | 12/1980 | Van Cleve et al. . |
| 4,327,005 | 4/1982 | Ramlow et al. . |
| 4,334,049 | 6/1982 | Ramlow et al. . |
| 4,359,541 | 11/1982 | Patton, Jr. et al. . |
| 4,359,550 | 11/1982 | Narayan et al. . |
| 4,390,645 | 6/1983 | Hoffman et al. . |
| 4,394,491 | 7/1983 | Hoffman . |
| 4,454,255 | 6/1984 | Ramlow et al. . |
| 4,458,038 | 7/1984 | Ramlow et al. . |
| 4,460,715 | 7/1984 | Hoffman et al. . |
| 4,477,603 | 10/1984 | Fisk . |
| 4,513,124 | 4/1985 | Hoffman . |
| 4,529,746 | 7/1985 | Markovs et al. . |
| 4,640,935 | 2/1987 | Fisk et al. . |
| 4,689,354 | 8/1987 | Ramlow et al. . |
| 4,690,956 | 9/1987 | Ramlow et al. . |
| 4,745,153 | 5/1988 | Hoffman . |
| 4,837,245 | 6/1989 | Streu et al. . |
| 5,059,632 | 10/1991 | Horn et al. . |
| 5,106,875 | 4/1992 | Horn et al. . |
| 5,268,418 | 12/1993 | Simroth . |

FOREIGN PATENT DOCUMENTS

| | | |
|---|---|---|
| 0439755 A2 | * 7/1991 | (EP) . |
| 439 755 | 8/1991 | (EP) . |
| WO 87/03886 | 7/1987 | (WO) . |

* cited by examiner

Primary Examiner—James J. Seidleck
Assistant Examiner—Olga Asinovsky
(74) Attorney, Agent, or Firm—Fernando A. Borrego

(57) ABSTRACT

The present invention relates to graft polyols employing a t-amyl peroxy compound as free radical initiator. The novel graft polyols are made by polymerizing at least one monomer in a polyol composition in the presence of a free radical initiator and preferably a chain transfer agent. The resulting graft polyols are in turn useful in reactions with polyisocyanates to make polyurethane products.

27 Claims, No Drawings

PROCESS FOR MAKING GRAFT POLYOLS USING T-AMYL PEROXY FREE RADICAL INITIATOR

FIELD OF THE INVENTION

The present invention relates to a process for making graft polyols employing t-amyl peroxy compounds as a free radical initiator. These graft polyols are useful for the production of polyurethane foams. The present invention also relates to low viscosity graft polymer dispersions in polyoxyalkylene polyether polyols.

More particularly, the invention relates to graft polymer dispersions prepared by a process employing free radical polymerization of an ethylenically unsaturated monomer or mixture of monomers in a polyol mixture containing an effective amount of induced unsaturation wherein the polymerization is conducted in the presence of a free radical initiator comprising a t-amyl peroxy compound. This improved process yields stable, low viscosity, non-settling graft polymer dispersions.

BACKGROUND OF THE INVENTION

The prior art, as evidenced by U.S. Pat. Nos. 3,652,639; 3,875,258; 3,950,317, and U.S. Pat. Nos. Re. 28,715; 29,014 and 33,291, teaches the preparation of graft polymer dispersions, which are useful in the preparation of polyurethanes by the polymerization of ethylenically unsaturated monomers in the presence of polyols. The above patents disclose various methods of preparing graft polymer dispersions. U.S. Pat. No. 3,931,092 teaches the preparation of polymeric solids by polymerizing in the presence of a free-radical initiator and an organic solvent. The solvent concentration employed is from about 1 part to 19 parts by weight per part of the hydroxy-terminated organic compound, which has a polymerizable carbon double bond. U.S. Pat. No. 3,953,393 teaches the preparation of graft copolymer dispersions by employing alkylmercaptan chain transferring agents at concentrations from 0.1 to 2 percent by weight based on the weight of vinyl monomer.

Stable dispersions of polymers in polyols have found broad commercial use in the preparation of polyurethanes. The use of these dispersions, known in the trade as graft or polymer polyols, improves processing and, among other properties, the firmness of the polyurethane products, often expressed as load bearing or modulus. There have been many attempts to improve the products representing the present state of the art. Efforts have been directed towards increasing the amount of polymer that is dispersed in the polyol, the obvious benefit being that firmer polyurethanes can be produced. Two major obstacles have been found: the viscosities of the resulting dispersions were too high and/or relatively high levels of acrylonitrile had to be used in the monomer mixtures employed.

Additionally, it would be desirable if polymer polyols could be prepared which exhibit better stability in terms of less agglomeration. Stability is important to the storage life of the polyols before they are used to make the polyurethane foams since many polymer polyols tend to undergo phase separation if they are not stabilized. Relatively low viscosities and small particle sizes are also important in a good quality polyol to permit it to be pumped easily in high volume foam producing equipment.

U.S. Pat. No. 4,148,840 to Shah and U.S. Pat. No. 4,242,249 to Van Cleve, et al. describe the use of preformed polymer polyols as dispersion stabilizers in the synthesis of SAN dispersion polyols. U.S. Pat. No. 4,148,840 describes preformed polymer polyol stabilizers which have a viscosity of less than 40,000 cP at 25° C. However, these materials are viscous dispersions or semi-solids, which tend to be difficult to work with.

U.S. Pat. No. 4,172,825 to Shook et al. relates to a process for producing polymeric polyols having high polymer contents. The reference describes a process for making polymer polyols employing a t-butyl peroxide as a free radical initiator. However, the resultant polymer polyols tend to have higher viscosities than those afforded by the present invention.

U.S. Pat. Nos. 4,327,005 and 4,334,049 to Ramlow et al. teach alkylene oxide adducts of styrene/allyl alcohol copolymers as preformed stabilizers for polymer polyols. The stabilizer may take the form of a graft copolymer dispersion or a finely divided solid polymer.

Further, Pizzini et al. in U.S. Pat. No. 3,652,639 describe the use of graft copolymers of acrylonitrile and an unsaturated polyol which are homogeneous, transparent liquids which may be employed directly in the preparation of flexible polyurethane foams. The unsaturated polyol is obtained by reacting an organic compound having both ethylenic unsaturation and a hydroxyl, carboxyl or epoxy group with a polyol. A number of additional patents also teach the use of an acryloyl capped unsaturated polyol copolymerized with styrene and acrylonitrile to produce polymer polyols. These patents include U.S. Pat. Nos. 4,460,715; 4,477,603; 4,640,935; 4,513,124; 4,394,491; and 4,390,645.

More recently, International Publication No. WO87/03886 and U.S. Pat. No. 4,745,153 teach the homo- or co-polymerization of vinyl terminated polyol adducts alone or together with an ethylenically unsaturated monomer or monomer mixture in the presence of an active hydrogen-containing compound as a solvent, and their use as preformed dispersants.

None of the related art, insofar as is known, either alone or in combination, teaches or suggests that highly stable, low viscosity graft polyols can be produced using t-amyl based free radical initiators, particularly in association with a semi-batch or continuous processes.

SUMMARY OF THE INVENTION

The present invention relates to a process for the preparation of graft polymer dispersions. The improved process employs free radical polymerization of at least one ethylenically unsaturated monomer in a polyol mixture containing an effective amount of, preferably less than 0.1 mole per mole of polyol mixture, induced unsaturation, wherein the free radical intiator comprises a t-amyl peroxy compound. Furthermore, it has been found that improved dispersions may be prepared by employing radical polymerization in a polyetherester polyol-polyoxyalkylene polyether polyol mixture containing less than 0.1 mole of induced unsaturation per mole of polyol mixture wherein the unsaturation moiety is an isomerized maleate-containing polyetherester polyol.

Preferably, the t-amyl peroxy compound employed is selected from the group consisting of t-amyl peroxy (2-ethylhexanoate); 1,1 bis(t-amyl peroxy)cyclohexane; and mixtures thereof. Additionally, the present invention relates to free radical initiators used for the production of graft polyols preferably formed utilizing a continuous graft reactor and to a process of producing graft polyols wherein the viscosity properties do not vary greatly from sample to sample.

DETAILED DESCRIPTION OF A PREFERRED EMBODIMENT OF THE PRESENT INVENTION

In accordance with the improved process for the preparation of stable graft polymer dispersions which are employed for the preparation of polyurethane foams, the improvement comprises conducting the polymerization of an ethylenically unsaturated monomer or mixtures of monomers in the presence of an effective amount of a free radical initiator in an unsaturated polyol mixture containing an effective amount of induced unsaturation, preferably less than 0.1 mole of induced unsaturation per mole of polyol mixture where the free radical initiator comprises a t-amyl peroxy compound. In another embodiment of the invention the polymerization of an ethylenically unsaturated monomer or mixture of monomers in the presence of an effective amount of the free radical initiator in an unsaturation-containing polyol mixture, preferably containing less than 0.1 mole of unsaturation per mole of polyol mixture, employs an improved process which comprises conducting the polymerization in a polyol mixture employing as part of the mixture a polyetherester polyol prepared by the reaction of a polyoxyalkylene polyether polyol with maleic anhydride and an alkylene oxide. This polyetherester polyol is isomerized by methods well known by those skilled in the art. These include heat, or isomerization catalysts such as morpholine, dibutylamine, diethylamine, diethanolamine, thiols and the like.

The polyols having induced unsaturation are hereinafter referred to as "macromers." Chain transfer agents may be employed as reaction moderators. The polymerization reaction may be carried out at temperatures between 25 deg. C. and 180 deg. C., preferably between 80 deg. C. and 140 deg. C. In one embodiment of the present invention, the polyol mixture contains less than about 0.1 mole, preferably from about 0.001 to about 0.09 mole, of unsaturation per mole of polyol mixture. Generally, the polyol mixture has an effective amount of induced unsaturation which shall be defined herein as having from about 0.001 to about 0.2 mole of induced unsaturation per mole of the polyol mixture.

The alkylene oxides that may be employed for the preparation of the polyetherester polyols include ethylene oxide, propylene oxide, butylene oxide, amylene oxide and mixtures of these oxides.

Generally, the graft polymer dispersions of this invention have viscosities less than 20,000 cP at 25 deg. C., preferably viscosities ranging from 2000 to 15,000 cP at 25 deg. C., and a solids content of from about 30 to about 70 percent, preferably from about 40 to about 60 percent, by weight based on the total weight of the polymer dispersion. Naturally, as the solids content in the graft polymer dispersion increases, so will the viscosity of the dispersion increase.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-napthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, dibromostilbene, alpha-bromostyrene, alpha-methylstyrene, tetraphenyl succinonitrile, 2,4,6-trinitrotoluene, p-toluidine, N,N-dimethyl-p-toluidine, alpha-cyano-p-tolunitrile, alpha, alpha'-dibromo-p-xylene, 2,6-xylenol, diethyl zinc, dithiodiacetic acid, ethyl dithiodiacetic acid, 4,4'-dithiobisanthranilic acid, benzenethiol, o-ethoxybenzenethiol, 2,2'-dithiobisbenzothiazole, benzyl sulfide, 1-dodecanethiol, ethanethiol, 1-hexanethiol, 1-napthalenethiol, 2-naphthalenethiol, 1-octanethiol, 1-heptanethiol, 2-octanethiol, 1-tetradecanethiol, alpha-toluenethiol, isopropanol, 2-butanol, carbon tetrabromide and tertiary dodecylmercaptan. Preferred chain transfer agents are 2-propanol and 2-butanol.

The chain transfer agents employed will depend on the particular monomers or mixtures of monomers employed and the molar ratios of such mixtures. The concentration of the chain transfer agent that is employed may range from 0.1 to 30 percent by weight, preferably from 5 to 20 percent by weight, based on the weight of monomer.

Representative polyols essentially free from ethylenic unsaturation that may be employed in combination with the macromers of the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclicamines, as well as mixtures thereof. Alkylene oxide adducts of compounds that contain 2 or more different groups within the above-defined classes may also be used, for example, amino alcohols that contain an amino group and a hydroxyl group. Also, alkylene oxide adducts of compounds which contain one SH group and one OH group as well as those which contain an amino group and an SH group may be used. Generally, equivalent weight of the polyols will vary from 100 to 10,000, preferably from 1000 to 3000.

Any suitable hydroxy-terminated polyester may be used such are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, alpha-methyl glycoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyetherpolyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyetherpolyols may be prepared by any known process such as, for example, the process disclosed by Wurtz in 1859 and Encyclopedia of Chemical Technology, Vol. 7, pp.257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.

Suitable polyhydric polythioethers that may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds that may be used include those compounds disclosed in U.S. Pat. No. 3,639,542. Preferred polyhydroxyl-containing phosphorus compounds are prepared from alkylene oxides and acids of phosphorous having a $P_2O_5$ equivalency of from about 72 percent to about 95 percent.

Suitable polyacetals that may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two—SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6,-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols or macromers which are employed in the present invention may be prepared by the reaction of any conventional polyol such as those described above with an organic compound having both ethylenic unsaturation and a hydroxyl, carboxyl, anhydride, isocyanate, or epoxy group, or other group reactive with an active hydrogen-containing group, or they may be prepared by employing an organic compound having both ethylenic unsaturation and a hydroxyl, carboxyl, anhydride, or epoxy group, or other group reactive with an active hydrogen-containing group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl, succinic anhydride, acrylic acid, acryoyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinylglycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed in such as to reduce the acid number of the unsaturated polyol to about 5 or less.

In one embodiment of the present invention, the maleated macromers are isomerized at temperatures ranging from 80 deg. C. to 120 deg. C. for one-half hour to three hours in the presence of an effective amount of an isomerization catalyst, which are well known to those skilled in the art. The catalyst is generally employed at concentrations greater than 0.01 weight percent based on the weight of the macromer.

When preparing the polyetherester polyol employing the catalyst selected from the group consisting of salts and oxides of divalent metals, the concentration of catalyst which may be employed ranges from 0.005 to 0.5 weight percent based on the weight of polyol mixture. The temperatures employed range from 75 deg. C. to 175 deg. C. The equivalent weight of the polyol used to make the macromer may vary from 1000 to 10,000, preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the isomerization of the maleate to the fumarate structure during the preparation of the macromer, while others such as zinc chloride, which is an effective catalyst for the polymerization, inhibit this isomerization.

As mentioned above, the graft polymer dispersions of the invention are prepared by the in situ polymerization, in the above-described polyols, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, alpha-methylstyrene, 2-methylstyrene, 3-methylstyrene and 4-methylstyrene, 2,4-dimethylstyrene, ethylstyrene, isopropylstyrene, butylstyrene, phenylstyrene, cycloexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl alpha-ethoxyacrylate, methyl alpha-acetaminoacrtylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinylmethoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinylphenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinylethyl ketone, vinyl phosphonates such as vinyl phenyl ketone, vinyl ethyl sulfone, N-methyl-N-vinyl acetamide, N-vinylpyrrolidone, vinyl imidazole, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like.

Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 70 percent, preferably from 40 percent to 60 percent, based on the total weight of the product. The polymerization occurs at a temperature between about 25 deg. C. and 180 deg. C., preferably from 80 deg. C. to 140 deg. C. It is preferred that at least 25 to 90 weight percent, more preferably between about 40 and 75 weight percent, of the monomer employed is styrene or 4-methylstyrene.

Generally, in the process of the present invention will employ from about 0.1 weight percent to about 3.0 weight percent, preferably from about 0.3 to about 1.0 weight percent, of free radical initiator based on the total weight of monomers employed.

In the process of the present invention, the free radical initiator comprises a t-amyl peroxy compound. Suitable t-amyl peroxy compounds include t-amyl peroxyneodecanoate; t-amyl peroxypivalate; t-amyl peroxy-2-ethylhexanoate; 1,1-di-(t-amyl peroxy)-3,3,5-trimethylcyclohexane; 2,2-[4,4-di(t-amyl peroxycyclohexyl)propane]; 1,1-di-(t-amyl peroxy)-cyclohexane; t-amyl peroxy-2-methylbenzoate; 1,1-di-(t-amyl peroxy)-3,5,5-trimethylcyclohexane; 2,2-di-(t-amyl peroxy)butane; di-t-amyl diperoxyazelate; t-amyl peroxy isopropyl carbonate; t-amyl peroxybenzoate; t-amyl peroxyacetate; n-butyl-4,4-di(t-amyl peroxy)valerate; di- t-amyl diperoxyphthalate; di-(2-t-amyl peroxyisopropyl)benzene; 2,5-dimethyl-25-di(t-amyl peroxy)hexane; 1,4-di-(2-t-amyl peroxyisopropyl)benzene; t-amyl cumyl peroxide; di-t-amyl peroxide; t-amyl hydroperoxide; t-amyl peroxydiethylacetate; t-amyl peroxyisobutyrate; t-amyl peroxy-2-ethylhexyl carbonate; t-amyl peroxy stearyl carbonate; t-amyl peroxy (2-ethylhexanoate); and 1,1-bis(t-amyl peroxy)cyclohexane. Such t-amyl peroxy compounds may be used either alone or in combination with each other.

In a preferred embodiment of the present invention, the free radical initiator is selected from the group consisting of t-amyl peroxy(2-ethylhexanoate); 1,1-bis(t-amyl peroxy) cyclohexane; and mixture thereof. More preferably, the free radical initiator composition of the present invention will include a certain amount of both t-amyl peroxy(2-ethylhexanoate) and 1,1-bis(t-amyl peroxy)cyclohexane. When used in combination with each other, the weight ratio of t-amyl peroxy(2-ethylhexanoate) to 1,1-bis(t-amyl peroxy)cyclohexane will generally be on the order of from about 1:10 to about 1:2, and more preferably from about 1:4 to about 1:3.

To the limited extent that other free radical initiators are used in combination with the t-amyl peroxy compounds described above in the process of the present invention, additional free radical initiators that may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, difuroyl peroxide, bis (triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha, alpha'-azobis-(2-methylheptonitrile), 1,1'-azo-bis(cyclohexane carbonitrile), 4,4'-azobis(4-cyanopentanoic acid), 2,2'-azobis (isobutyronitrile), 1-t-butylazo-1-cyanocyclohexane, persuccinic acid, diisopropyl peroxy dicarbonate, 2,2'-azobis(2, 4-dimethylvaleronitrile), 2-t-butylazo-2-cyano-4-methoxy-4-methylpentane, 2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isobutyronitrile, to butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, 2-t-butylazo-2-cyano-butane and lauroyl peroxide.

General descriptions of graft polymer dispersions and processes for preparing graft polymer dispersions are set forth in U.S. patents U.S. Pat. No. RE 33,291; U.S. Pat. Nos. 4,690,956; 4,689,354; 4,458,038; 4,4550,194; and 4,661, 531; the disclosures of which are incorporated herein by reference.

The polyurethane foams employed in the present invention are generally prepared by the reaction of a graft polymer dispersion with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514, the disclosure of which is incorporated herein by reference, together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidenechloride, and methylene chloride may be used as blowing agents.

Organic polyisocyanates that may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyldiisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

As mentioned above, the graft polyols may be employed along with another polyhydroxyl-containing component commonly employed in the art. Any of the polyhydroxyl-containing components that are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl) ethylenediamine, N,N'-di(2-hydroxypropyl) ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

It has been found that when graft polymer dispersions of the present invention are used in the preparation of polyurethane foam products, a flame retardant compound is preferably incorporated into the foam product to impart flame retardancy. Among the flame retardants which may be employed are: pentabromodiphenyl oxide, dibromopropanol, tris(beta-chloropropyl)phosphate, 2,2-bis (bromoethyl) 1,3-propanediol, tetrakis(2-chloroethyl) ethylene diphosphate, tris(2,3-dibromopropyl)phosphate, tris(beta-chloroethyl)phosphate, tris(1,2-dichloropropyl) phosphate, bis-(2-chloroethyl) 2-chloroethylphosphonate, molybdenum trioxide, ammonium molybdate, ammoniumphosphate, pentabromodiphenyloxide, tricresyl phosphate, hexabromocyclododecane and dibromoethyldibromocyclohexane. The concentrations of flame retardant compounds which may be employed range from 5 to 25 parts per 100 parts of polyol mixture.

The following examples illustrate the nature of the invention and are not to be construed as limiting of the invention. Unless otherwise indicated, all parts are given as parts by weight.

EXAMPLES

Polyol A is a 30% (1:1 acrylonitrile/styrene) dispersion in Polyol C using 2,2'-azobis(2-methylbutanenitrile).

Polyol B is a trimethylolpropane-initiated propylene oxide, ethylene oxide adduct containing an ethylene oxide cap and having a hydroxyl number of 25.

Polyol C is a trimethylolpropane-initiated propylene oxide, ethylene oxide adduct containing an ethylene oxide cap and having a hydroxyl number of 35.

Polyol D is a 50% (1:1 acrylonitrile/styrene) dispersion in Polyol C using 2,2'-azobis(2-methylbutanenitrile).

Polyol E is a 50% (1:2 acrylonitrile/styrene) dispersion in Polyol C using USP 90 PX.

Polyol G is a 45% (1:2 acrylonitrile/styrene) dispersion in Polyol C using USP 90 PX.

Polyol H is a glycerin-initiated propylene oxide, ethylene oxide adduct containing 12.5 wt. % ethylene oxide (heteric) and a propylene oxide cap, and having a hydroxyl number of 51.

Polyol J is a 43% (1:2 acrylonitrile/styrene) dispersion in Polyol H using 2,2'-azobis(2-methylbutanenitrile).

Polyol K is a 50% (1:2 acrylonitrile/styrene) dispersion in Polyol H using USP 90 PX.

Polyol L is a 50% (1:2 acrylonitrile/styrene) dispersion in Polyol H using 2,2'-azobis(2-methylbutane-nitrile) and USP 90 PX.

Polyol M is a 50% (1:2 acrylonitrile/styrene) dispersion in Polyol H using 2,2'-azobis(2-methylbutanenitrile) and USP 90 PX.

Polyol N is a 50% (1:1 acrylonitrile/styrene) dispersion in Polyol H using 2,2'-azobis(2-methylbutanenitrile) and USP 90 PX.

Polyol O is a 50% (1:1 acrylonitrile/styrene) dispersion in Polyol H using 2,2'-azobis(2-methylbutanenitrile).

Polyol P a propylene glycol-initiated propylene oxide adduct having a hydroxyl number of 145.

Polyol Q is a 60% (45:55 acrylonitrile/styrene) dispersion in Polyol P using 2,2'-azobis(2-methylbutanenitrile) and USP 90 PX.

Polyol R is a 60% (45:55 acrylonitrile/styrene) dispersion in Polyol P using 2,2'-azobis(2-methylbutanenitrile) and USP 90 PX.

Polyol S is a 60% (45:55 acrylonitrile/styrene) dispersion in Polyol P using 2,2'-azobis(2-methylbutanenitrile) and USP 90 PX Polyol T is a 60% dispersion (45:55 acrylonitrile/styrene) in Polyol P using 2,2'-azobis(2-methylbutanenitrile) and USP 90 PX.

Polyol X is a 43% dispersion (1:2 acrylonitrile/styrene) in Polyol H using VAZO 67.

Polyol W is a 50% dispersion (1:2 acrylonitrile/styrene) in Polyol H using USP 90 PX.

VAZO 67 is 2,2'-azobis(2-methylbutanenitrile) polymerization initiator commercially available from E. I. DuPont Co.

USP 90 PX is 1,1'-bis(t-amylperoxy)cyclohexane, 80% solution in 2,2',4-trimethyl-1,3 pentane diol isobutyrate available from Witco Corporation.

LUPERSOL 575 is a t-amyl peroxy (2-ethylhexanoate) available from Lucidol, Inc.

DC-5043 is a silicone surfactant available from Dow Corning Corporation.

DEOA-LF is diethanolamine with 15% water available from Union Carbide Corporation.

Dabco 33 LV is a 33% solution of triethenetriamine in dipropylene glycol available from Air Products Corporation.

Niax A-1 is an amine catalyst made by Union Carbide Corp.

T-12 is an organotin catalyst made by Air Products Corp.

AB 100 is a chlorinated phosphate ester flame retardant commercially available from Albright & Wilson, Inc.

Macromer A is a fumarate ester-containing polyether polyol made by reacting a trimethylolpropane/propylene oxide adduct capped with 4.8% ethylene oxide and a hydroxyl number of 25, with maleic anhydride in the presence of a calcium naphthenate catalyst and the capping with propylene oxide. A representative procedure for synthesis is described in U.S. Pat. No. RE 33,291 column 11, procedure A.

Macromer B is a fumarate ester-containing polyether polyol made by reacting a glycerine/propylene oxide adduct with 25% ethylene oxide structure, 20% present as a heteric, 5% as a cap, and a hydroxyl number of 25, with maleic anhydride in the presence of a calcium naphthenate catalyst and the capping with propylene oxide. A representative procedure for synthesis is described in U.S. Pat. No. RE 33,291, column 11, procedure A.

Macromer C is a 1-(1-isocyanato-1-methylethyl)-3-(1-methylethenyl) benzene adduct containing polyether polyol made by reacting a sucrose/dipropylene glycol-initiated polyether polyol propylene oxide adduct with 5% ethylene oxide cap, and a hydroxyl number of 25 A representative procedure for synthesis is described in U.S. Pat. No. 5,093,412.

A 300-ml flow-through reactor is used to make the graft polyols of the present invention on a continuous basis under pressure. The reactor is run full, i.e., there is no headspace. Initially, it contains a polyol or graft polyol. In the start-up phase, the material pumped through the reactor is discarded until the desired product is being produced. The reaction mixture consisting of polyol, macromer, monomers, reaction moderator and free radical initiator enters the reactor at the bottom, is mixed with the material already in the reactor at the top through a spring loaded valve. Pressure in the reactor is maintained at 60–120 psi, at a reaction temperature of 140° C.–160° C.

After the crude product leaves the reactor, it is no longer under pressure. It is collected and stripped in a glass flask at <0.1 mm Hg pressure at 125° C. for a minimum of 30 minutes to remove volatiles such as unreacted monomers. The finished product is stabilized by the addition of antioxidants, cooled and stored in an appropriate container.

Once the desired graft polyols are attained, various foam samples as set forth in Tables 1–4 Are prepared by introducing a polyisocyanate composition at the desired index to the graft polyol composition with certain physical properties such as density, tensile strength, elongation and tear strength being analyzed.

As demonstrated in Tables 1–4 below, graft polyols employing t-amyl peroxy compounds as free radical initiator in accordance with the teachings of the present invention have lower viscosities and significantly better dispersion stability when compared to graft polyols prepared using t-butyl peroxy compounds as the free radical initiator.

TABLE 1

1.8 pound per cubic foot density foam at 20% graft polymer solids level

| Foam number | 1 | 2 | 3 | 4 | 5 | 6 | 7 |
| --- | --- | --- | --- | --- | --- | --- | --- |
| Components, pbw | | | | | | | |
| Polyol A | 65 | | | | 65 | | |
| Polyol B | 35 | 35 | 35 | 35 | 35 | 35 | 35 |
| Polyol C | | 25 | 25 | 25 | | 25 | 25 |
| Polyol D | | 40 | | | | 40 | |
| Polyol E | | | 40 | | | | 40 |
| Polyol G | | | | 40 | | | |
| DC-5043 | 0.8 | 0.8 | 0.8 | 0.8 | 0.8 | 0.8 | 0.8 |
| DEOA-LF | 1.6 | 1.6 | 1.6 | 1.6 | 1.6 | 1.6 | 1.6 |
| DABCO 33LV | 0.12 | 0.12 | 0.12 | 0.12 | | | |
| NIAX A-1 | 0.04 | 0.04 | 0.04 | 0.04 | 0.04 | 0.04 | 0.04 |
| T-12 | 0.06 | 0.06 | 0.06 | 0.06 | 0.06 | 0.06 | 0.06 |
| AB-100 | 4.0 | 4.0 | 4.0 | 4.0 | 4.0 | 4.0 | 4.0 |
| Water | 3.0 | 3.0 | 3.0 | 3.0 | 3.0 | 3.0 | 3.0 |
| TDI | 40.51 | 40.51 | 40.51 | 40.51 | 40.51 | 40.51 | 40.51 |
| TDI index | 105 | 105 | 105 | 105 | 105 | 105 | 105 |
| % graft polymer solids | 20 | 20 | 20 | 20 | 20 | 20 | 20 |
| Foam properties: | | | | | | | |
| Density, pcf | 1.82 | 1.76 | 1.74 | 1.86 | 1.75 | 1.68 | 1.65 |
| Tensile, psi | 22 | 19 | 21 | 24 | 28 | 19 | 24 |
| Humid aged tensile, psi | 21 | 16 | 22 | 21 | 27 | 22 | 25 |
| Elongation, % | 152 | 127 | 138 | 161 | 146 | 111 | 148 |
| Tear, pi | 2.9 | 1.8 | 3.2 | 2.8 | 3.4 | 2.4 | 3.2 |

TABLE 2

| Graft polyol | A | D | E | G |
|---|---|---|---|---|
| Ingredients: | | | | |
| Carrier polyol: Polyol C | 67 | 42.39 | 47.36 | 47.36 |
| acrylonitrile | 15.5 | 15.94 | 14.64 | 14.64 |
| styrene | 15.5 | 31.87 | 29.27 | 29.27 |
| macromer type | A | B | B | B |
| macromer amount | 1.24 | 2.15 | 1.98 | 1.98 |
| reaction moderator type | dodecane-thiol | 2-propanol | 2-propanol | 2-propanol |
| reaction moderator amount | 0.31 | 7.17 | 6.58 | 6.58 |
| VAZO 67 (free radical initiator) | 0.31 | 0.48 | — | 0.09 |
| USP 90 PX (free radical initiator) | — | — | 0.18 | 0.09 |

TABLE 3

| | Graft polyol: | | | | | |
|---|---|---|---|---|---|---|
| Ingredients: | J | K | L | M | N | O |
| Carrier polyol: Polyol H | 54.71 | 41.96 | 41.96 | 41.96 | 41.96 | 41.68 |
| acrylonitrile | 14.33 | 15.94 | 15.94 | 15.94 | 15.94 | 15.94 |
| styrene | 28.67 | 31.87 | 31.87 | 31.87 | 31.87 | 31.87 |
| macromer type: | A | A | A | A | A | A |
| macromer amount | 1.61 | 2.87 | 2.87 | 2.87 | 2.87 | 2.87 |
| reaction moderator type | dodecanethiol | 2-propanol | 2-propanol | 2-propanol | 2-propanol | 2-propanol |
| reaction moderator amount | 0.43 | 7.17 | 7.17 | 7.17 | 7.17 | 7.17 |
| VAZO 67 (free radical initiator) | 0.25 | — | 0.05 | 0.095 | 0.04 | 1.48 |
| USP 90PX (free radical initiator) | — | 0.19 | 0.14 | 0.095 | 0.15 | — |

TABLE 4

| | Graft polyol designation | | | | | |
|---|---|---|---|---|---|---|
| Ingredients: | Q | R | S | T | W | X |
| Carrier polyol: Polyol P | 31.45 | 31.45 | 31.45 | 31.11 | 41.94 | 46.93 |
| acrylonitrile | 25.34 | 25.34 | 25.34 | 25.34 | 15.94 | 22.35 |
| styrene | 30.97 | 30.97 | 30.97 | 30.97 | 31.87 | 27.35 |
| macromer type: | B | B | B | B | A | C |
| macromer amount | 3.38 | 3.38 | 3.38 | 3.38 | 2.87 | 2.48 |
| reaction moderator type | 2-propanol | 2-propanol | 2-propanol | 2-propanol | 2-propanol | 2-butanol/water |
| reaction moderator amount | 8.45 | 8.45 | 8.45 | 8.45 | 7.17 | 9.92/0.58 |
| VAZO 67 (free radical initiator) | 0.17 | 0.17 | — | 0.34 | — | 0.33 |
| USP 90PX (free radical initiator) | 0.25 | 0.25 | 0.42 | 0.42 | 0.24 | — |

Graft polymer dispersions according to the present invention may also be prepared in a semi-batch reactor. A suitable reactor is provided and subjected to the following procedure. The reactants and levels thereof are set forth in Table 5 below. After charging the 1 liter four-neck RB flask, the reaction mixture is heated to the reaction temperature. The monomer and the polyol mixture are added through a Kenics static mixer for the specified time. After the reaction period, the mixture is vacuum stripped for 30 minutes at about 1 mm Hg. The reaction temperature is 125° C., monomer addition time is 210 minutes, polyol/LUPERSOL 575 addition time is 220 minutes; reaction time is 30 minutes; and stirring is performed at 300 rpm.

As demonstrated in Table 5 below, graft polyols employing t-amyl peroxy compounds as free radical initiator in accordance with the teachings of the present invention have lower viscosities than those graft polyols prepared using a t-butyl peroxy compound as the free radical initiator. However, as also illustrated, substantially less initiator is required when the t-amyl compounds are employed.

While it will be apparent that the preferred embodiments of the invention disclosed are well calculated to fulfill the objects stated, it will be appreciated that the invention is susceptible to modification, variation and change without departing from the spirit thereof.

TABLE 5

| EXAMPLE | MAC (g) | POLYOL charge (g) | POLYOL feed (g) | RX MOD (g) | AN (g) | STY (g) | LUPERSOL (g) | RX TEMP (*c) | ADD TIME (MIN) MON | ADD TIME (MIN) POLYOL | VISCOSITY mPas, 25° C. | WT % VINYL |
|---|---|---|---|---|---|---|---|---|---|---|---|---|
| 1 | 9.00a | 171.0 | 180.0b | 2.40c | 80.0 | 160.0 | 1.50 | 125 | 210 | 220 | 5240 | 38.64 |
| 2 | 9.00a | 171.0 | 180.0b | 2.40c | 80.0 | 160.0 | 1.80 | 125 | 210 | 220 | 6160 | 38.66 |
| 3 | 9.00a | 171.0 | 180.0b | 2.40c | 80.0 | 160.0 | 1.20 | 125 | 210 | 220 | 5440 | 38.58 |
| 4 | 9.00a | 171.0 | 180.0b | 2.40c | 80.0 | 160.0 | 1.50 | 125 | 210 | 220 | 5460 | 38.34 |
| 5 | 9.00a | 171.0 | 180.0b | 1.20f | 80.0 | 160.0 | 1.50 | 125 | 210 | 220 | 3860 | 38.30 |
| 6 | 9.00a | 171.0 | 180.0b | 2.40c | 80.0 | 160.0 | 0.60 | 125 | 210 | 220 | 3850 | 37.67 |
| 7 | 9.00a | 171.0 | 180.0b | 2.40c | 80.0 | 160.0 | 0.60 | 125 | 210 | 220 | 3490 | 37.02 |
| 8 | 9.00a | 171.0 | 180.0b | 2.40c | 80.0 | 160.0 | 0.90 | 125 | 210 | 220 | 4440 | 37.87 |
| 9 | 9.00a | 171.0 | 180.0b | 2.40f | 160.0 | 80.0 | 1.20 | 125 | 210 | 220 | 3990 | 38.96 |
| 10 | 12.00a | 138.0 | 150.0j | 3.00c | 100.0 | 200.0 | 1.50 | 125 | 240 | 250 | 3420 | 48.29 |
| 11 k | 12.00a | 138.0 | 150.0j | 3.00f | 200.0 | 100.0 | 1.50 | 125 | 240 | 250 | 2750 | 49.03 |
| 12 | 9.00a | 171.0 | 180.0b | 2.40c | 80.0 | 160.0 | 1.50 | 125 | 210 | 220 | 5580 | 38.86 |
| 13 g | 9.00a | 171.0 | 180.0b | 2.40c | 80.0 | 160.0 | 1.50 | 125 | 210 | 220 | 6600 | 38.50 |
| 14 g | 9.00a | 171.0 | 180.0b | 2.40c | 80.0 | 160.0 | 0.90 | 125 | 210 | 220 | 5280 | 38.27 |
| 15 g | 9.00a | 171.0 | 180.0b | 2.40c | 80.0 | 160.0 | 0.60 | 125 | 210 | 220 | 4220 | 37.71 |
| 16 g | 9.00a | 171.0 | 180.0b | 2.40c | 80.0 | 160.0 | 1.20 | 125 | 210 | 220 | 5100 | 37.81 |
| 17 g | 9.00a | 171.0 | 180.0b | 2.40c | 80.0 | 160.0 | 1.80 | 125 | 210 | 220 | 8860 | 38.50 |
| 18 g | 9.00a | 171.0 | 180.0b | 2.40f | 160.0 | 80.0 | 1.20 | 125 | 210 | 220 | 5920 | 38.76 |
| 19 g | 12.00a | 138.0 | 150.0j | 3.00c | 100.0 | 200.0 | 1.50 | 125 | 240 | 250 | 3240 | 48.35 |
| 20 g,k | 12.00a | 138.0 | 150.0j | 3.00f | 200.0 | 100.0 | 1.50 | 125 | 240 | 250 | 3250 | 48.78 | a Macromer A.
b Polyol H.
c 1-dodecanethiol.
f bromotrichloromethane.
g a t-butyl peroxy octoate.
j Polyol P.
k solids build-up on sides of flask.

What is claimed is:

1. A process for the preparation of a stable, low viscosity graft polymer dispersion comprising polymerizing at least one ethylenically unsaturated monomer with a macromer containing an effective amount of induced unsaturation in the presence of a free radical initiator mixture comprising a blend of t-amyl peroxy (2-ethylhexanoate) and 1,1'-bis (t-amyl peroxy) cyclohexane at a weight ratio of from 1:10 to 1:2.

2. A process as defined in claim 1 wherein said ethylenically unsaturated monomer is present in an amount of from about 25 wt. % to about 70 wt. % based on the total weight of all components.

3. A process as defined in claim 1 wherein said ethylenically unsaturated monomer or mixture of monomers is present in an amount of from about 40 wt. % to about 60 wt. % based on the total weight of all components.

4. A process as defined in claim 1 wherein said free radical initiator mixture is present in an amount of between about 0.1 wt % to about 3.0 wt. % based on the weight of said ethylenically unsaturated monomer.

5. A process as defined in claim 1 wherein said free radical initiator mixture is present in an amount of between about 0.3 wt % to about 1.0 wt. % based on the weight of said ethylenically unsaturated monomer.

6. A process as defined in claim 1 wherein the weight ratio is from about 1:4 to about 1:3.

7. A process as defined in claim 1 wherein said macromer is present in an amount of from about 30 wt. % to about 75 wt. % based on the total weight of all components.

8. A process as defined in claim 1 wherein said macromer is present in an amount of from about 40 wt. % to about 60 wt. % based on the total weight of all components.

9. A process as defined in claim 1 wherein said graft polymer dispersion has an average viscosity of from about 2000 to about 15,000 cP at 25° C. and a solids content of from about 40 to about 60 percent, based on the total weight of the dispersion.

10. A process as defined in claim 1, wherein said macromer contains from about 0.001 to about 0.09 mole of unsaturation per mole of said macromer.

11. A process for the preparation of a stable, low viscosity, high solids content graft polymer dispersion, said process comprising polymerizing in situ at least one ethylenically unsaturated monomer with a macromer containing from 0.001 to 0.09 moles of induced unsaturation per mole of said macromer in the presence of and effective amount of a chain transfer agent and a free radical initiator mixture, wherein said free radical initiator mixture comprises a blend of t-amyl peroxy (2-ethylhexanoate) and 1,1'-bis(t-amyl peroxy) cyclohexane at a weight ratio of from 1:10 to 1:2.

12. A process as defined in claim 11 wherein said ethylenically unsaturated monomer is present in an amount of from about 25 wt. % to about 70 wt. % based on the total weight of all components.

13. A process as defined in claim 11 wherein said ethylenically unsaturated monomer or mixture of monomers is present in an amount of from about 40 wt. % to about 60 wt. % based on the total weight of all components.

14. A process as defined in claim 11 wherein said free radical initiator mixture is present in an amount of between about 0.1 wt % to about 3.0 wt. % based on the weight of said ethylenically unsaturated monomer.

15. A process as defined in claim 11 wherein said free radical initiator mixture is present in an amount of between about 0.3 wt % to about 1.0 wt. % based on the weight of said ethylenically unsaturated monomer.

16. A process as defined in claim 11 wherein the weight ratio is from about 1:4 to about 1:3.

17. A process as defined in claim 11 wherein said macromer is present in an amount of from about 30 wt. % to about 75 wt. % based on the total weight of all components.

18. A process as defined in claim 11 wherein said macromer is present in an amount of from about 40 wt. % to about 60 wt. % based on the total weight of all components.

19. A process as defined in claim 11 wherein said graft polymer dispersion has an average viscosity of from about 2000 to about 15,000 cP at 25° C. and a solids content of from about 40 to about 60 percent, based on the total weight of the dispersion.

20. A process as defined in claim 11 wherein said at least one ethylenically unsaturated monomer comprises a blend of styrene and acrylonitrile.

21. A process as defined in claim 11 wherein said macromer comprises an isomerized maleate-containing macromer.

22. A process as defined in claim 11 wherein said macromer comprises a macromer prepared from a compound containing fumarate unsaturation.

23. A process for the preparation of a stable, low viscosity graft polymer dispersion, said process comprising polymerizing in the presence of a free radical initiator mixture (a) at least one ethylenically unsaturated monomer with (b) a polyol mixture comprising (1) a polyoxyalkylene polyether polyol having an equivalent weight from 100 to 10,000; and (2) a macromer containing an effective amount of induced unsaturation, wherein said free radical initiator mixture comprises a blend of t-amyl peroxy (2-ethylhexanoate) and 1,1'-bis(t-amyl peroxy) cyclohexane at a weight ratio of from 1:10 to 1:2.

24. A process as defined in claim 23 wherein said ethylenically unsaturated monomer or mixture of monomers is present in an amount of from about 40 wt. % to about 60 wt. % based on the total weight of all components.

25. A process as defined in claim 23 wherein said free radical initiator mixture is present in an amount of between about 3.0 wt. % to about 1.0 wt. % based on the weight of said ethylenically unsaturated monomer.

26. A process as defined in claim 23 wherein said polyol mixture is present in an amount of from about 40 wt. % to about 60 wt. % based on the total weight of all components.

27. A process as defined in claim 23 wherein said macromer contains from about 0.001 to about 0.09 mole of unsaturation per mole of said polyol mixture.

* * * * *